United States Patent [19]

Resasco et al.

[11] Patent Number: 6,096,193
[45] Date of Patent: Aug. 1, 2000

[54] SULFUR-TOLERANT AROMATIZATION CATALYSTS

[75] Inventors: Daniel E. Resasco; Cristina L. Padro; Gary Jacobs; Haiyang Liu, all of Norman, Okla.

[73] Assignee: The Board of Regents of the University of Oklahoma, Norman, Okla.

[21] Appl. No.: 09/286,200

[22] Filed: Apr. 5, 1999

Related U.S. Application Data

[62] Division of application No. 09/055,544, Apr. 6, 1998.

[51] Int. Cl.[7] .............................. C10G 35/09; C07C 5/41
[52] U.S. Cl. .......................... 208/137; 208/138; 585/418; 585/419; 585/440; 585/444; 585/476; 585/477; 585/481; 585/482
[58] Field of Search ............................ 208/137; 585/418, 585/419, 440, 444, 476, 477, 481, 482

[56] References Cited

U.S. PATENT DOCUMENTS

| | | | |
|---|---|---|---|
| 4,104,320 | 8/1978 | Bernard et al. | 260/673.5 |
| 5,328,675 | 7/1994 | Vaughan et al. | 423/328.2 |
| 5,540,833 | 7/1996 | Larsen et al. | 208/137 |
| 6,017,442 | 1/2000 | Wu et al. | 208/137 |

OTHER PUBLICATIONS

B. Delmon and G.F. Froment, "The Sulfur Poisoning of Pt Alkaline L. Zeolites", 1980, pp. 201–211, Catalyst Deactivation.

M. Vaarkamp, J.T. Miller, F.S. Modica, G.S. Lane, and D.C. Koningsberger, Sulfur Poisoning of a Pt/BaK–LTL Catalyst: A Catalytic and Structural Study Using Hydrogen Chemisorption and X–ray Absorption Spectroscopy, 1992, pp. 675–685, Journal of Catalysts 138.

G.B. McVicker, J.L. Kao, J.J. Ziemiak, W.E. Gates, J.L. Robbins, M.M. J. Treacy, S.B. Rice, T.H. Vanderspurt, V.R. Cross, and A.K. Ghosh, Effect of Sulfur on the Performance and on the Particle Size and Location of Platinum in Pt/KL Hexane Aromatization Catalysts, 1992, pp. 48–61, Journal of Catalysts 139.

Robert J. Davis, "Aromatization on Zeolite L–Supported Pt Clusters", 1994, pp. 41–53, HCR Concise Review.

Fengyi Li, Weiqi Lu and Guanghui Wu, "A study of platinum–dysprosium–KL zeolite reforming catalyst", 1994, pp. 397–399, Journal of Alloys and Compounds.

T. Fukunaga and V. Ponec, "The Nature of the High Sensitivity of Pt/KL Catalysts to Sulfur Poisoning", 1995, pp. 550–558, Journal of Catalysts 157.

J.T. Miller and D.C. Koningsberger, The Origin of Sulfur Tolerance in Supported Platinum Catalysts: The Relationship between Structural and Catalytic Properties in Acidic and Alkaline Pt/LTL, 1996, pp. 209–219, Journal of Catalysts 162.

Xiangming Fang, Fengyi Li, and Laitao Luo, "A study of platinum–thulium/KL zeolite reforming catalysts", 1996, pp. 297–304, Applied Catalysis A: General 146.

Z. Paal, K. Matusek, M. Muhler, "Sulfur absorbed on Pt catalyst: its chemical state and effect on catalytic properties as studied by electron spectroscopy and n–hexane test reactions", 1997, pp. 113–132, Applied Catalysts A: General 149.

T.R. Hughes, W.C. Buss, P.W. Tamm, and R.L. Jacobson, Aromatization of Hydrocarbons over Platinum Alkaline Earth Zeolites, pp. 725–732, Chevron Research Company.

Primary Examiner—Bekir L. Yildirim
Attorney, Agent, or Firm—Dunlap, Codding & Rogers, P.C.

[57] ABSTRACT

A catalytic material is provided which effectuates the aromatization, reformation, and dehydrogenation of aliphatic, cycloaliphatic, and mixtures of aliphatic and cycloaliphatic hydrocarbons. The catalyst comprises an L–zeolite associated with a Group VIII metal such as platinum and having a rare earth metal ion incorporated therein. A method of using the catalytic material is also provided.

38 Claims, 7 Drawing Sheets

SULFUR-TOLERANT AROMATIZATION CATALYSTS

This is a divisional of copending application Ser. No. 09/055,544 filed on Apr. 6, 1998.

BACKGROUND OF THE INVENTION

1. Field of the Invention

The present invention relates generally to sulfur-tolerant aromatization catalysts and methods of making and using same, and more particularly to a catalyst comprising a Group VIII metal associated with an L-zeolite wherein the L-zeolite has been incorporated with at least one rare earth ion.

2. Brief Description of Related Art

Pt/L-zeolite catalysts are effective catalysts for the aromatization of aliphatic and cycloaliphatic hydrocarbons such as the aromatization of n-hexane to benzene. Pt/L-zeolite catalysts' ability to achieve high aromatization yields was discovered by Bernard et al. in 1980. As opposed to other standard reforming catalysts, the alkane aromatization on Pt/L catalysts is monofunctional, that is, because the support is non-acidic, the reaction occurs on the metal, i.e., the reaction occurs on the Pt metal sites. Indeed, any residual acidity on the zeolite is detrimental to the catalytic properties of the Pt/L-zeolite catalyst.

The L-zeolite support plays a very important role in determining the properties of Pt/L-zeolite catalysts even though it is not directly involved in the catalytic reactions. When other basic molecular sieves, such as cation-exchanged mordenite, omega, X, or Y zeolites, are used as supports the aromatization selectivity of the catalyst is significantly lower. It is also known that exchanging the cations in the zeolite has a dramatic effect on the catalysts' catalytic properties. For example, if K is replaced by Ba in the catalyst, the selectivity of the Pt/BaL-zeolite was significantly higher, whereas replacing the K with Mg resulted in a Pt/MgL-zeolite catalyst having poor selectivity and stability. In order to justify these results, it was previously shown that replacing K with Mg results in the zeolite having an increase in acidity. This research resulted in the discovery of unique materials which further led to the development of a commercial process for the production of benzene and other aromatic hydrocarbons. In recent years, increasing environmental restrictions relating to the shipping and handling of aromatic hydrocarbons has led to an increased desire for the economical and safe production of aromatic hydrocarbons on site.

After their discovery, it was realized that Pt/L-zeolite catalysts are extremely sensitive to "sulfur poisoning". The high sensitivity of the Pt/L-zeolite catalysts to the presence of even minute amounts of sulfur in the hydrocarbon feed has therefore severely limited their industrial applications as almost all hydrocarbon feeds contain some amount of sulfur. For example, it has been shown that a Pt/BaKL catalyst, which in a sulfur-free environment is able to maintain a high yield of aromatic hydrocarbons for 12 months, became inactive within several days when 1 ppm of sulfur was added to the feed. Similarly, It has been demonstrated that sulfur is a potent poison for these catalysts in that both feed conversion and selectivity to benzene is greatly decreased if 0.2 ppm of sulfur is added to the hydrocarbon feed. It was further shown that a sulfur-free hydrocarbon feed running at 510° C., exhibited an 8% decrease in percent conversion from 90% to 83% conversion during the first 100 hours of run. By contrast, a run conducted in the presence of only 0.2 ppm of sulfur, which was added to the feed as thiophene, resulted in a 67% decrease in percent conversion from 90% to 30% conversion during the first 100 hours of run. Similar results were obtained when selectivity was compared. For the sulfur-free run, the selectivity dropped from 75% to 68% while the sulfur enriched run resulted in selectivities around 30%. Therefore, a sulfur tolerant catalyst became increasingly necessary.

The high sulfur sensitivity of Pt/L-zeolite catalysts is still a subject of controversy. By analyzing the amount of sulfur deposited and the corresponding drop in activity, researchers concluded that the deactivation by sulfur was due to a progressive loss of Pt active sites by blocking of the zeolite channels rather than to a modification of the catalytic (electronic) nature of the catalyst. It was observed that metal agglomeration occurred in an amount that roughly corresponded to the size of the pore mouth.

In a similar, but independent work conducted on Pt/BaKL catalysts, Vaarkamp et al. also investigated the effects of minute amounts of sulfur in the n-hexane feed. Thev observed that when the aromatization rate decreased to 30% of its original value, the size of the Pt clusters, as measured by EXAFS analysis, increased from 5–6 atoms in the fresh sample to 13 atoms. It was therefore proposed that sulfur was located at the metal-zeolite interface, thus deanchoring the particle and promoting sintering. It is important, therefore, to understand that the deactivation of the Pt/L-zeolite catalyst by sulfur requires the removal of the sulfur, the redispersion of the Pt particles, and the relocation of the Pt particles inside the channels of the zeolite. Finally, a different explanation has been proposed: it has been postulated that the high aromatization activity of Pt/KL catalysts is due to a direct participation of the $K^+$ ions with sulfur, thus inhibiting the $K^+$ ions' ability to promote aromatization.

There have been several attempts to increase the sulfur tolerance of the Pt/KL catalysts. For example, researchers at Sun Co. patented a composition of matter that includes the addition of Ni to Pt/KL catalysts. The resulting PtNi/KL catalyst reduces the rate of Pt particle growth in the presence of sulfur and exhibits a moderate improvement in the rate of deactivation by sulfur. Recently, Fang and co-workers proposed that Pt/KL catalysts modified by $Tm_2O_3$ exhibit aromatization activity and sulfur resistance which is higher than that of unmodified Pt/KL catalysts. The preparation method reported by these authors, however, results in a catalyst that exhibits a poorer performance than that of the catalysts of the present invention.

Thus, it is an object of the present invention to provide a sulfur-tolerant Pt/L-zeolite catalyst for the conversion of aliphatic and cycloaliphatic hydrocarbons and combinations thereof.

It is yet a further object of the present invention to provide a method for producing a sulfur-tolerant Pt/L-zeolite catalyst for the conversion of aliphatic and cycloaliphatic hydrocarbons and combinations thereof.

It is still a further object of the present invention to provide methods for the reformation, dehydrogenation, and aromatization of aliphatic and cycloaliphatic hydrocarbons and combinations thereof via a sulfur-tolerant Pt/L-zeolite catalyst.

These and other objects of the present invention will become apparent in light of the attached specification, claims, and drawings.

SUMMARY OF THE INVENTION

The present invention provides a catalytic material. The catalytic material includes an L-zeolite support which has a Group VIII metal associated therewith. The L-zeolite support is first dried and then incorporated with a rare earth ion. The rare earth ion may be any such ion selected from the group consisting of lanthanum, cerium, praseodymium, neodymium, samarium, europium, gadolinium, terbium, dysprosium, holmium, erbium, thulium, ytterbium, and lutetium. The rare earth ion may also be any combination of ions selected from the above-referenced group.

It is also preferred that the Group VIII metal be platinum and that the rare earth ion be thulium. In yet a further embodiment, it is contemplated that the rare earth ion be erbium or ytterbium. In any of the embodiments, it is contemplated that the L-zeolite be a KL-zeolite and that the rare earth ion be incorporated with the L-zeolite by ion exchange, incipient wetness impregnation, or chemical deposition methods.

The present invention also provides a method of preparing a catalytic material. The method comprises the steps of: (1) heating an L-zeolite in air so as to substantially remove water; (2) incorporating the substantially water free L-zeolite with at least one rare earth ion; (3) calcining the rare earth ion incorporated L-zeolite so as to substantially decompose the rare earth ion precursors and form rare earth oxides, thereby providing a rare earth ion modified L-zeolite support; and (4) associating a Group VIII metal with the rare earth modified L-zeolite support to provide the catalytic material.

In a preferred embodiment of the method, the rare earth ion is incorporated with the L-zeolite from about 0.01 to 1.0 weight percent, and in a more particularly preferred embodiment, the rare earth ion is incorporated with the L-zeolite from about 0.1 to 0.2 weight percent.

In any of the embodiments of the method, it is contemplated that the Group VIII metal be platinum and that in a preferred embodiment that the Group VIII metal, such as platinum, be associated with the rare earth modified L-zeolite support from about 0.1 to 3.0 weight percent. One preferred embodiment also contemplates that the Group VIII metal is associated with the rare earth modified L-zeolite by chemical vapor deposition, incipient wetness impregnation, or ion exchange.

In any of the embodiments of the method, it is contemplated that the rare earth ions be thulium, erbium, or ytterbium, or any combinations thereof. In any of the methods, it is contemplated that the rare earth ion be incorporated by ion exchange or by incipient wetness impregnation.

In any of the embodiments of the method, it is preferred that the L-zeolite be KL-zeolite.

The present invention also provides a method of reforming an aliphatic hydrocarbon, a cycloaliphatic hydrocarbon, and mixtures thereof. The method comprises the step of contacting the hydrocarbons under reforming conditions with a catalyst. It is contemplated that the catalyst comprise an L-zeolite support having a Group VIII metal associated therewith. The L-zeolite support is calcined and incorporated with a rare earth ion selected from the group consisting of lanthanum, cerium, praseodymium, neodymium, samarium, europium, gadolinium, terbium, dysprosium, holmium, erbium, thulium, ytterbium, lutetium, and combinations thereof. The method may also comprise the step of collecting the reformed aliphatic and cycloaliphatic hydrocarbons and mixtures thereof.

In a preferred embodiment of the reforming method, the Group VIII metal is platinum. The Group VIII metal may be associated with the L-zeolite support by chemical vapor deposition, incipient wetness impregnation or ion exchange.

The present invention also provides a method of aromatizing an aliphatic hydrocarbon, a cycloaliphatic hydrocarbon, and mixtures thereof. The method comprises the step of contacting the hydrocarbons under aromatizing conditions with a catalyst. It is contemplated that the catalyst comprise an L-zeolite support having a Group VIII metal associated therewith. The L-zeolite support is calcined and incorporated with a rare earth ion selected from the group consisting of lanthanum, cerium, praseodymium, neodymium, samarium, europium, gadolinium, terbium, dysprosium, holmium, erbium, thulium, ytterbium, lutetium, and combinations thereof. The method may also comprise the step of collecting the aromatized aliphatic and cycloaliphatic hydrocarbons and mixtures thereof.

In a preferred embodiment of the aromatizing method, the Group VIII metal is platinum. The Group VIII metal may be associated with the L-zeolite support by chemical vapor deposition.

The present invention also provides a method of dehydrogenating an aliphatic hydrocarbon, a cycloaliphatic hydrocarbon, and mixtures thereof. The method comprises the step of contacting the hydrocarbons under dehydrogenating conditions with a catalyst. It is contemplated that the catalyst comprise an L-zeolite support having a Group VIII metal associated therewith. The L-zeolite support is calcined and incorporated with a rare earth ion selected from the group consisting of lanthanum, cerium, praseodymium, neodymium, samarium, europium, gadolinium, terbium, dysprosium, holmium, erbium, thulium, ytterbium, lutetium, and combinations thereof. The method may also comprise the step of collecting the dehydrogenated aliphatic and cycloaliphatic hydrocarbons and mixtures thereof.

In a preferred embodiment of the dehydrogenating method, the Group VIII metal is platinum. The Group VIII metal may be associated with the L-zeolite support by chemical vapor deposition.

In yet another preferred embodiment, it is contemplated that the rare earth ion be thulium, erbium, ytterbium, or combinations of these rare earth ions. Also, the rare earth ions may be incorporated with the L-zeolite support by ion exchange or by incipient wetness impregnation.

In any of the embodiments, it is contemplated that the L-zeolite be KL-zeolite and that the hydrocarbons contain an amount of sulfur.

DETAILED DESCRIPTION OF THE INVENTION

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention provides a catalytic material which comprises an L-zeolite support having a Group VIII metal associated therewith and which is incorporated with a rare earth ion. The Group VIII metal ion may be any Group VIII metal ion while the rare earth ion is to be selected from the group consisting of lanthanium, cerium, praseodymium, neodymium, samarium, europium, gadolinium, terbium, dysprosium, holmium, erbium, thulium, ytterbium, and lutetium. One of ordinary skill in the art will also appreciate that combinations of two or more of the above listed rare earth ions are also considered for use and are being claimed herein. For example and not by way of a limitation, the rare earth ion could be a combination of Tm, Nd, and Gd, or Er, Dy, and Tb.

L type zeolites are synthetic zeolites such as chabazite and crystallise in the hexagonal system. A theoretical formula is $M_{9/n}[(AlO_2)_9(SiO_2)_{27}]$ in which M is a cation having the valency n. The real formula may vary without changing the crystalline structure; for example the ratio of silicon to aluminum may vary from 2.5 to 3.5. A more complete description of these zeolites is given in U.S. Pat. No. 3,216,789 which, more particularly, gives a conventional description of these zeolites with respect to their X-ray diffraction spectrum. The zeolites occur in the form of cylindrical crystals a few hundred Angstroms in diameter and have channel-shaped pores. In one embodiment of the invention, the L-zeolite is more specifically a KL-zeolite.

It is contemplated that the rare earth ion be incorporated with the L-zeolite in an amount of from about 0.01 to 1.0 weight percent, or from about 0.1 to about 0.2 weight percent, or in an amount from about 0.05 to about 0.3 weight percent, based on the total weight of the catalyst. One of ordinary skill in the art will appreciate that the amount of rare earth ion to be incorporated with the L-zeolite is dependent upon the dispersion of the ions. Although it is specifically claimed that the rare earth ion is incorporated with the L-zeolite by either ion exchange or incipient wetness impregnation methods, it is to be understood that any method capable of incorporating a rare earth ion so as to reach comparable dispersion is contemplated for use, e.g., chemical vapor deposition.

In one embodiment, the Group VIII metal is associated with the rare earth modified L-zeolite support in an amount of from about 0.1 to about 3.0 weight percent, based on the total weight of the catalyst. One of ordinary skill in the art will appreciate that the amount of Group VIII metal associated with the rare earth modified L-zeolite support is dependent upon the amount of metal that can be incorporated into the channels of the zeolite. Further, although it is specifically claimed that the Group VIII metal is associated with the rare earth ion modified L-zeolite support by incipient wetness, ion exchange, or chemical vapor deposition, it is to be understood that any method capable of associating the Group VIII metal with the L-zeolite modified support so as to result in a large fraction of the metal inside the pores of the zeolite is contemplated for use.

It is also contemplated that the L-zeolite support is substantially anhydrous. The term "substantially anhydrous", as used herein and in the claims, refers to an L-zeolite support which has been calcined at a suitable temperature to remove water from the micropores and stored in a dry environment.

The present invention also includes a method of preparing a atalytic material. The method comprises the steps of (1) providing a substantially anhydrous L-zeolite; (2) calcining an L-zeolite so as to substantially remove water; (3) incorporating the substantially anhydrous L-zeolite with at least one rare earth ion; (4) calcining the rare earth ion incorporated L-zeolite thereby providing a rare earth ion modified L-zeolite support; and (5) associating a Group VIII metal with the rare earth modified L-zeolite support to provide the catalytic material.

It is contemplated that the rare earth ion is incorporated with the L-zeolite in an amount from about 0.01 to about 1.0 weight percent based on the total weight of the catalyst. The rare earth ion may also be incorporated with the L-zeolite in an amount of from about 0.1 to about 0.2 weight percent based on the total weight of the catalyst. The rare earth ions may be thulium, erbium, ytterbium and combinations thereof. Furthermore, the rare earth ions may be incorporated by incipient wetness impregnation, by ion exchange, or by chemical vapor deposition, both methods being well known to those of ordinary skill in the art.

The Group VIII metal is contemplated as being platinum and is associated with the rare earth modified L-zeolite support in an amount of from about 0.1 to about 3.0 weight percent based on the total weight of the catalyst. Also, the Group VIII metal may be associated with the rare earth ion modified L-zeolite support via ion exchange, incipient wetness impregnation, or chemical vapor deposition or by any similar or known means.

The invention also comprises methods for reforming, aromatizing, and dehydrogenating an aliphatic hydrocarbon, a cycloaliphatic hydrocarbon, and mixtures of both using the catalyst of the herein described invention. The methods comprise the step of contacting the hydrocarbons under either reforming aromatizing, or dehydrogenating conditions with the catalyst of the present invention. All reactions occur simultaneously and conditions refer to the pressure, temperature, and composition of materials to effect the reactions. The catalyst of the present invention refers to the catalyst which has been fully described hereinabove.

The invention will be more clearly understood from the following non-limiting examples which are given so as to illustrate the catalyst and methods of using and producing the same as claimed herein.

EXAMPLE 1

To study the effect of the partial exchange with the rare earth ion, two equivalent catalysts were prepared using as a base support a KL zeolite (from Tosoh Corp.), calcined in air at 400° C. for 3 hours. The first catalyst (Pt/KL) was prepared using the calcined KL zeolite while the other (Pt/Tm-KL) was prepared using a Tm-modified KL zeolite.

The Tm-modified zeolite was prepared by exchanging the previously calcined KL zeolite with a $Tm(NO_3)_3$ aqueous solution of concentration $2.3\times10^{-3}$ M. The ion exchange was conducted by contacting the zeolite to the $Tm^{3+}$ solution for 12 hours at room temperature and then filtering and washing with distilled water. After drying in air, the sample was recalcined at 350° C. for 2 hours. For both catalysts, the loading of Pt was accomplished by incipient wetness impregnation, using an aqueous solution of $7.4\times10^{-2}$ M $Pt(NH_3)_4(NO_3)_2$ at a liquid/solid ratio of 0.7 $cm^3/g$. The resulting Pt loading in both catalysts was 1.0 wt % of the total weight of the catalyst.

The n-hexane aromatization activity of the two catalysts was compared on a series of 70-hour runs in a laboratory steady-state flow reactor operating in the vapor phase at atmospheric pressure and 500° C. Before reaction, the catalysts were activated in situ by flowing 50 $cm^3/min$ hydrogen, while the temperature was increased with a heating rate of 4° C./min from room temperature to 500° C. After 6 hours at 500° C., the feed flow was initiated. In all cases, the $H_2$:n-hexane molar ratio was kept at 6:1. Two different feeds were employed. The sulfur-free runs were conducted using liquid n-hexane from Aldrich (>99% purity), which was continuously injected into the pre-heated inlet hydrogen stream, using a precision syringe pump. The sulfur-containing runs were conducted using an appropriate liquid mixture of thiophene and n-hexane injected into the hydrogen stream to yield an overall sulfur concentration of 600 ppb.

Figure 1:
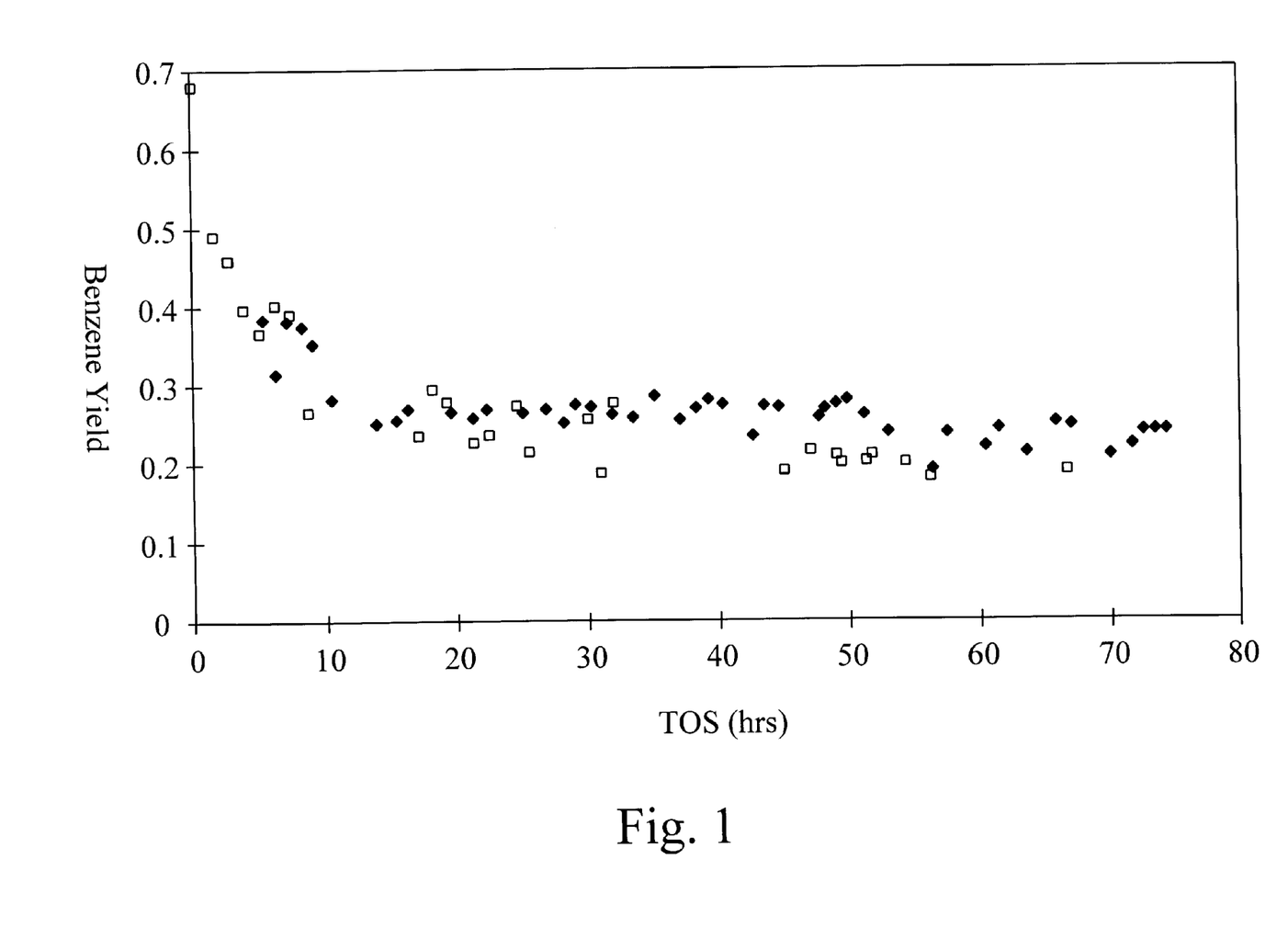
FIG. 1 is a graphical representation showing the benzene yield obtained on Pt/K-L zeolite (empty symbols) and Pt/Tm-K-L zeolite (full symbols) using a feed free of sulfur at WHSV 5 h$^{-1}$ and 500° C.

In the sulfur-free runs (FIG. 1) the benzene yields on both samples exhibited an initial decay followed by a plateau during which the activity stayed at the same value during the 70 hours of the run. The initial activity of the Tm-containing catalyst was slightly lower than the Pt/KL but after 20 hours it was slightly higher. These runs demonstrate that, using a sulfur-free feed, the presence of Tm did not positively or negatively affect the catalytic behavior of the Pt/KL catalyst.

Figure 2:
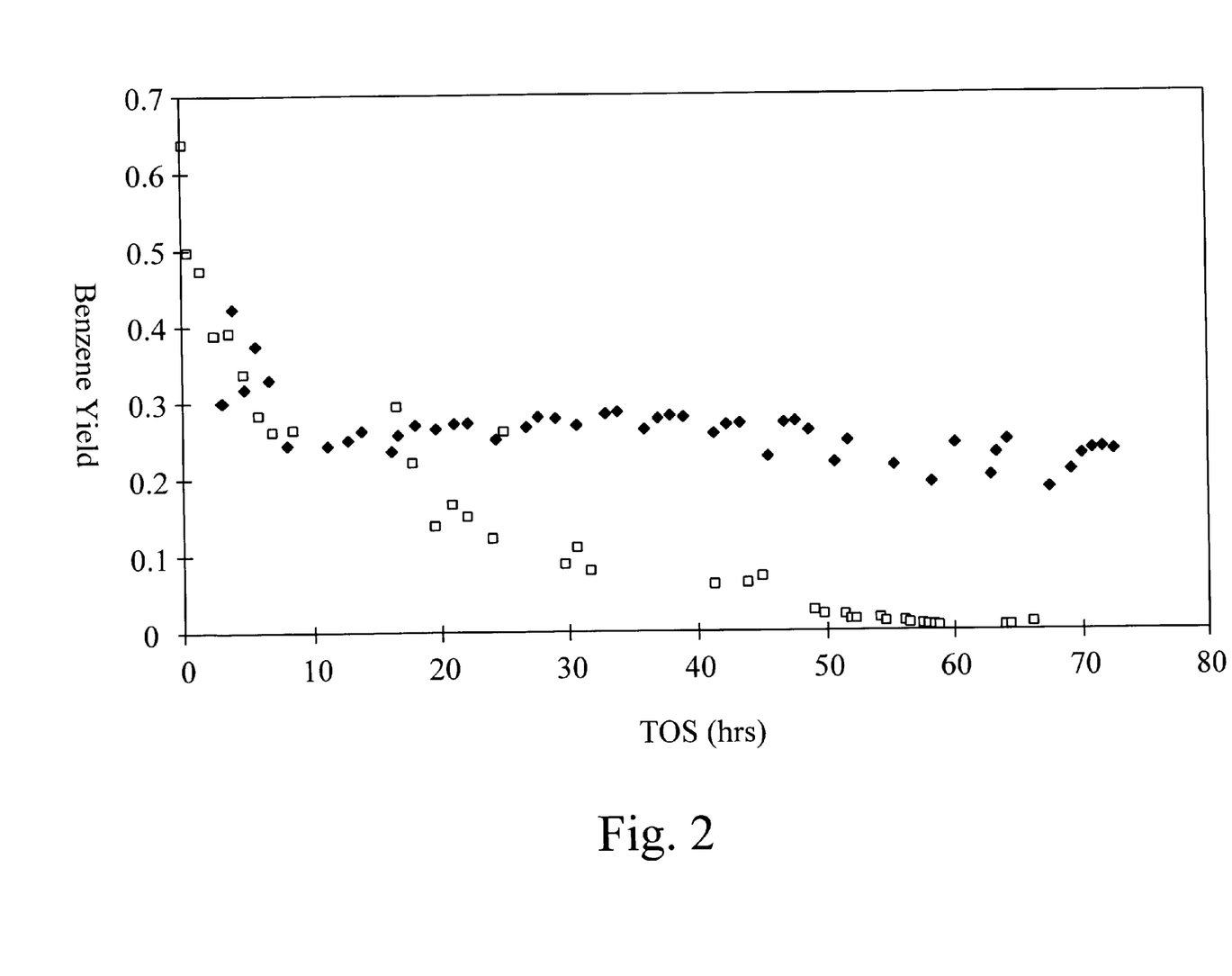
FIG. 2 is a graphical representation showing the benzene yield obtained on Pt/K-L zeolite (empty symbols) and Pt/Tm-K-L zeolite (full symbols) using a feed containing 600 ppb sulfur at WHSV 5 h$^{-1}$ and 500° C.

In the presence of 600 ppb sulfur (FIG. 2), the reactivity of the Tm-containing catalyst was markedly different from that of the Pt/KL catalyst. While the Pt/KL catalyst deactivated to almost zero benzene yield after about 50 hours on stream, the Tm-containing catalyst remained at substantially the same activity as the sulfur free runs. The following table summarizes the benzene yield after 70 hours on stream on the four catalysts investigated:

| Catalyst | Sulfur | BZ yield at WHSV 5 $h^{-1}$ |
| --- | --- | --- |
| 1.0% Pt/KL | nil | 20% |
| 1.0% Pt/KL | 600 ppb | 1% |
| 1.0% Pt/TmKL | nil | 22% |
| 1.0% Pt/TmKL | 600 ppb | 22% |

Figure 3:
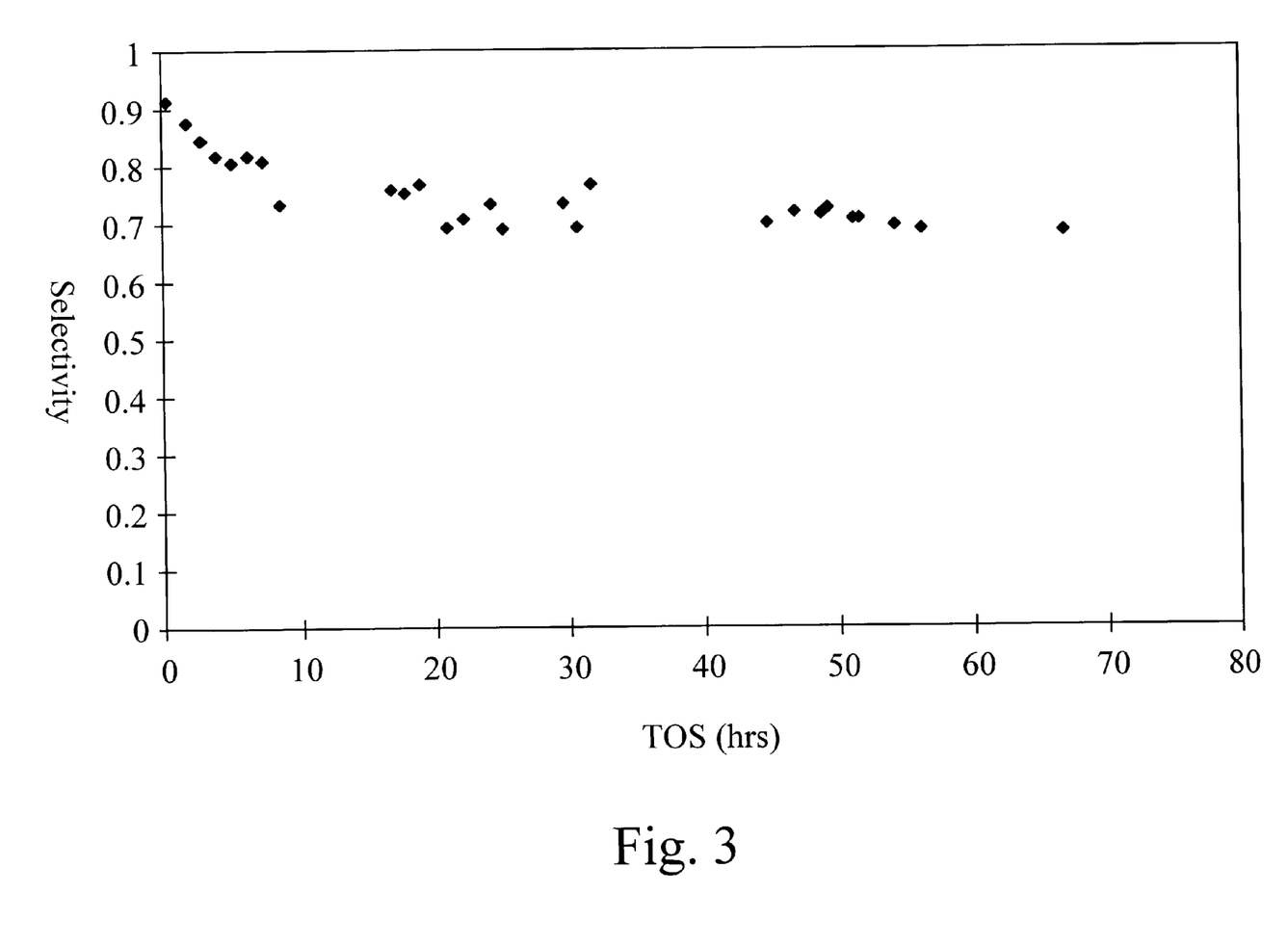
FIG. 3 is a graphical representation showing the benzene selectivity as a function of time on stream over the Pt/KL zeolite using a feed free of sulfur.
Figure 4:
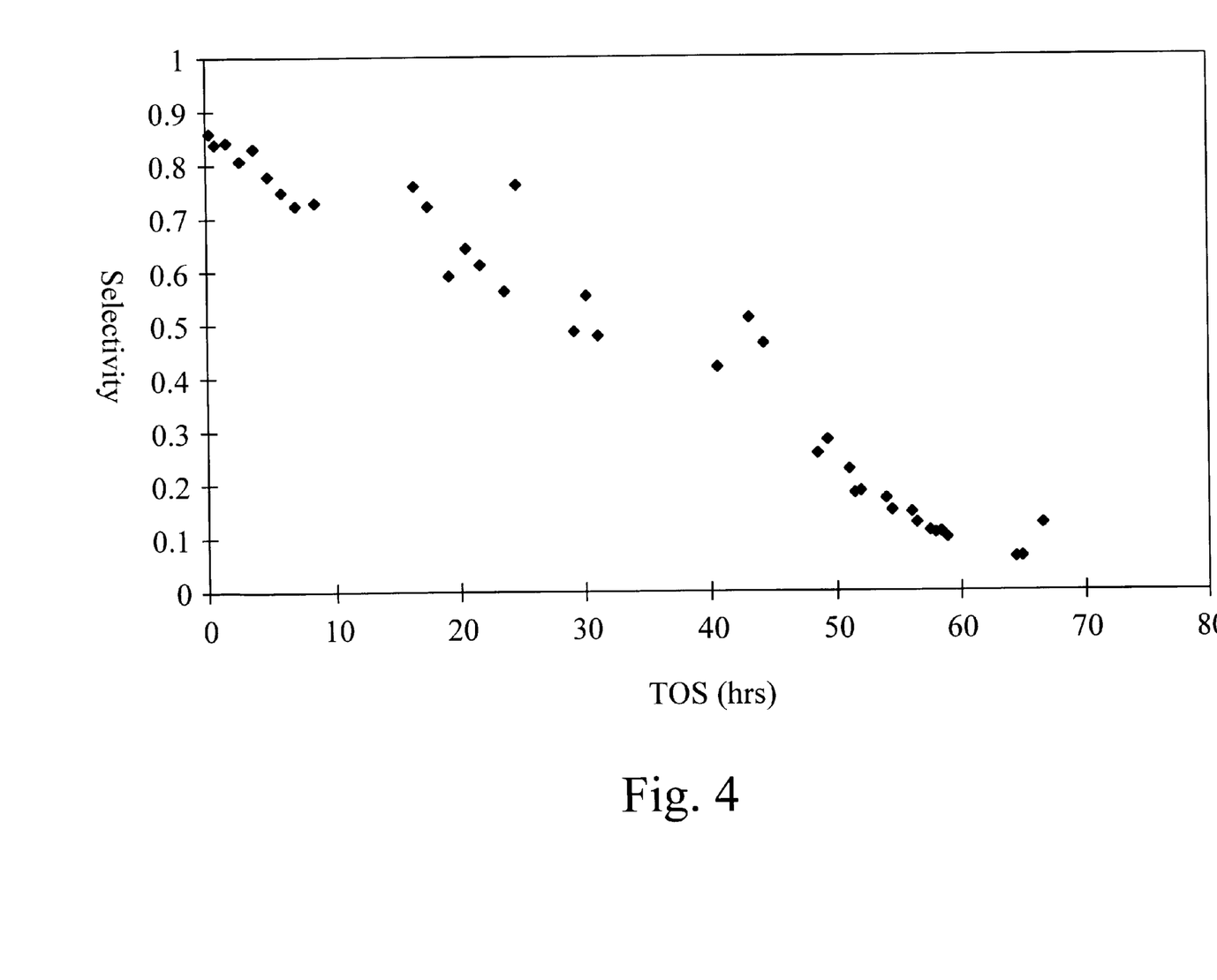
FIG. 4 is a graphical representation showing the benzene selectivity as a function of time on stream over the Pt/KL zeolite using a feed containing 600 ppb sulfur.

The improved performance of the Pt/TmKL catalyst composition is best illustrated in the variation of benzene selectivity as a function of time on stream during the 70-hour runs. The benzene selectivity in this study has been defined as moles benzene produced divided by the sum of $C_4$–$C_6$ products. The $C_1$–$C_3$ products were not included in these calculations. FIGS. 3 and 4 show the dramatic negative effect of the presence of sulfur on the Pt/KL catalyst. In the sulfur-free run, the selectivity of the Pt/KL catalyst presented a slight initial decay, but remained constant for the rest of the run. By contrast, in the presence of 600 ppb sulfur, the selectivity of the Pt/KL catalyst drastically dropped.

Figure 5:
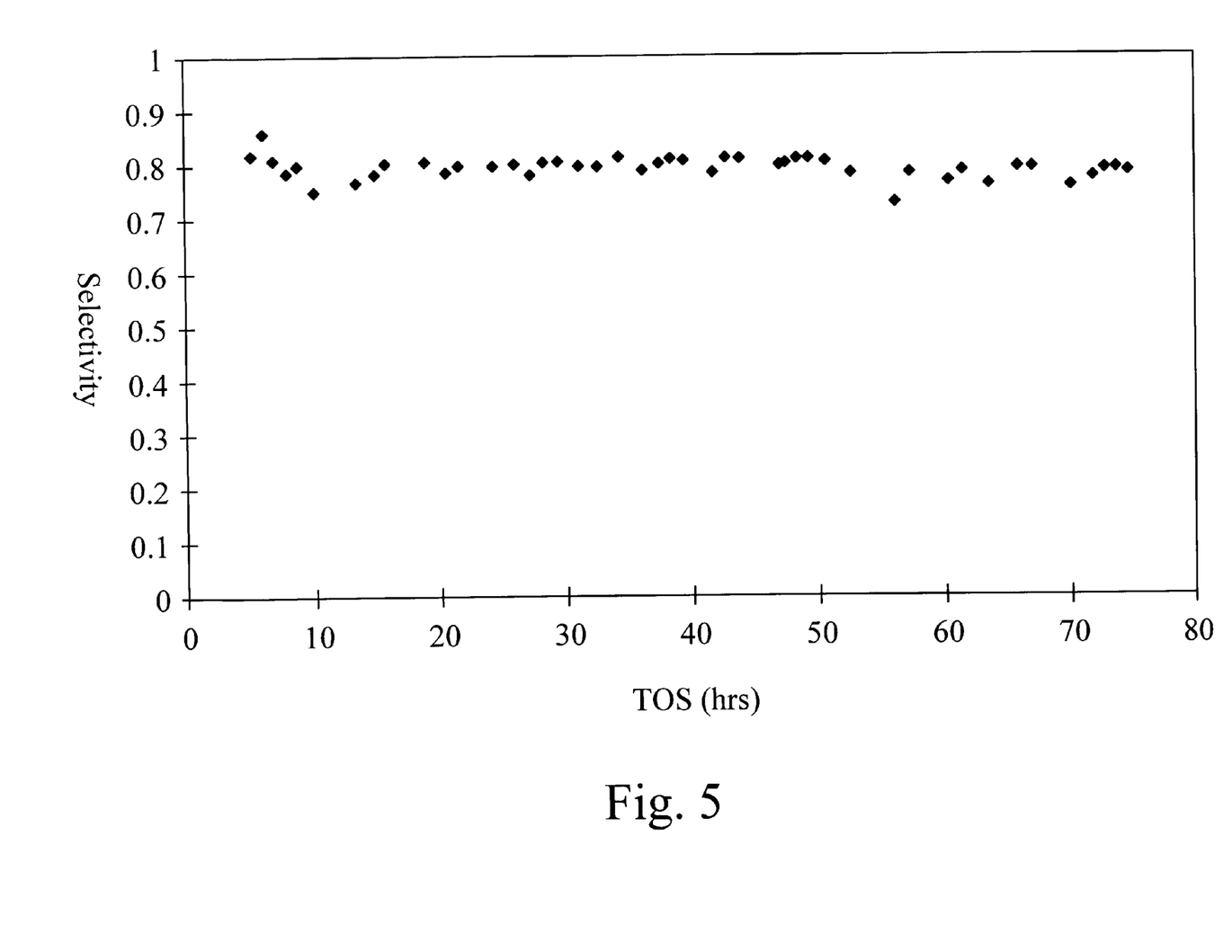
FIG. 5 is a graphical representation showing the benzene selectivity as a function of time on stream over the Pt/Tm-KL zeolite using a feed free of sulfur.
Figure 6:
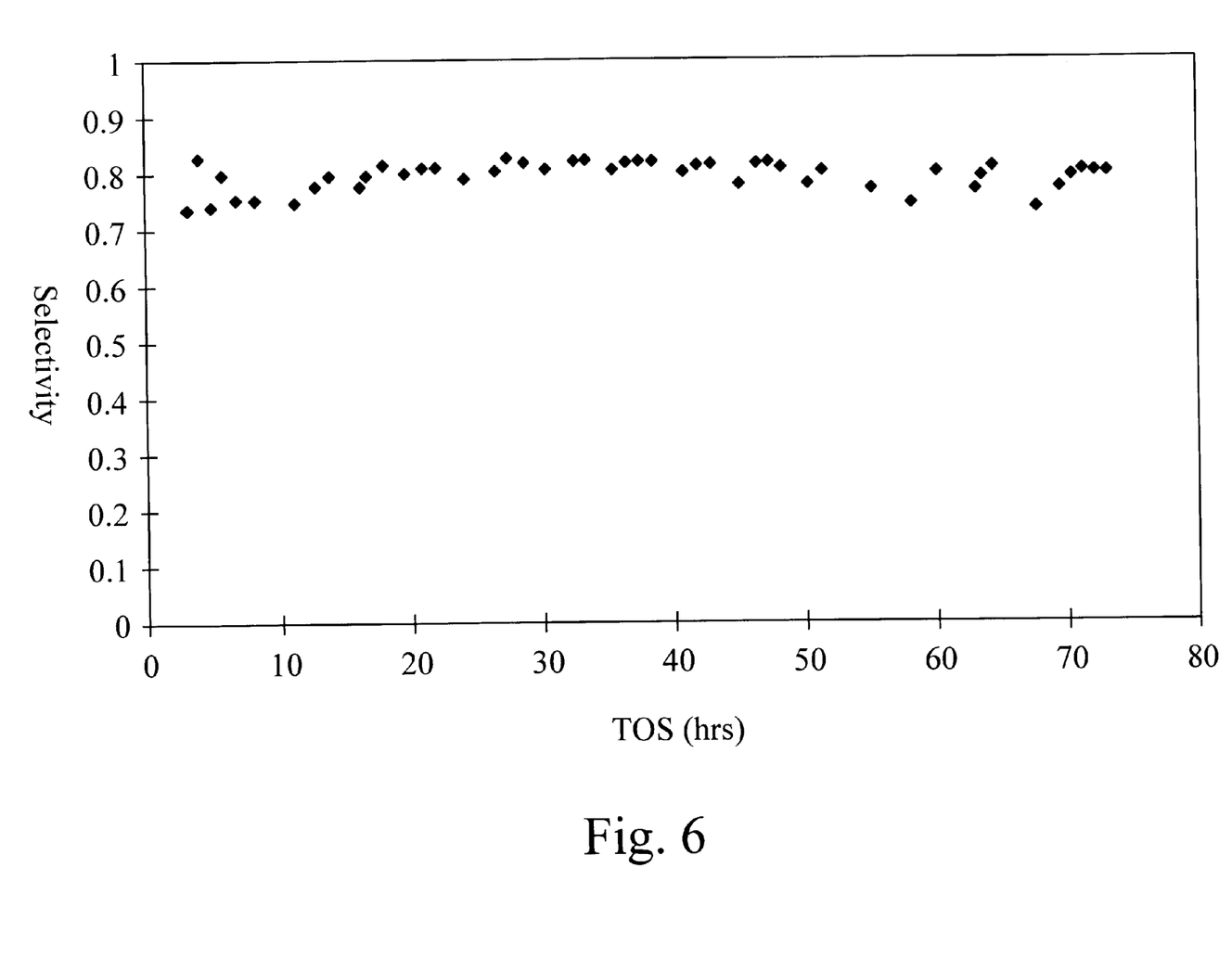
FIG. 6 is a graphical representation showing the benzene selectivity as a function of time on stream over the Pt/Tm-KL zeolite using a feed containing 600 ppb sulfur.

The remarkable sulfur tolerance of the Pt/Tm-KL catalysts is illustrated in FIGS. 5 and 6. In this case, the selectivity profile of the Pt/Tm-KL catalyst is practically flat as a function of time on stream and, in the presence of 600 ppb sulfur, it is almost identical to that of the sulfur-free runs.

EXAMPLE 2

Figure 7:
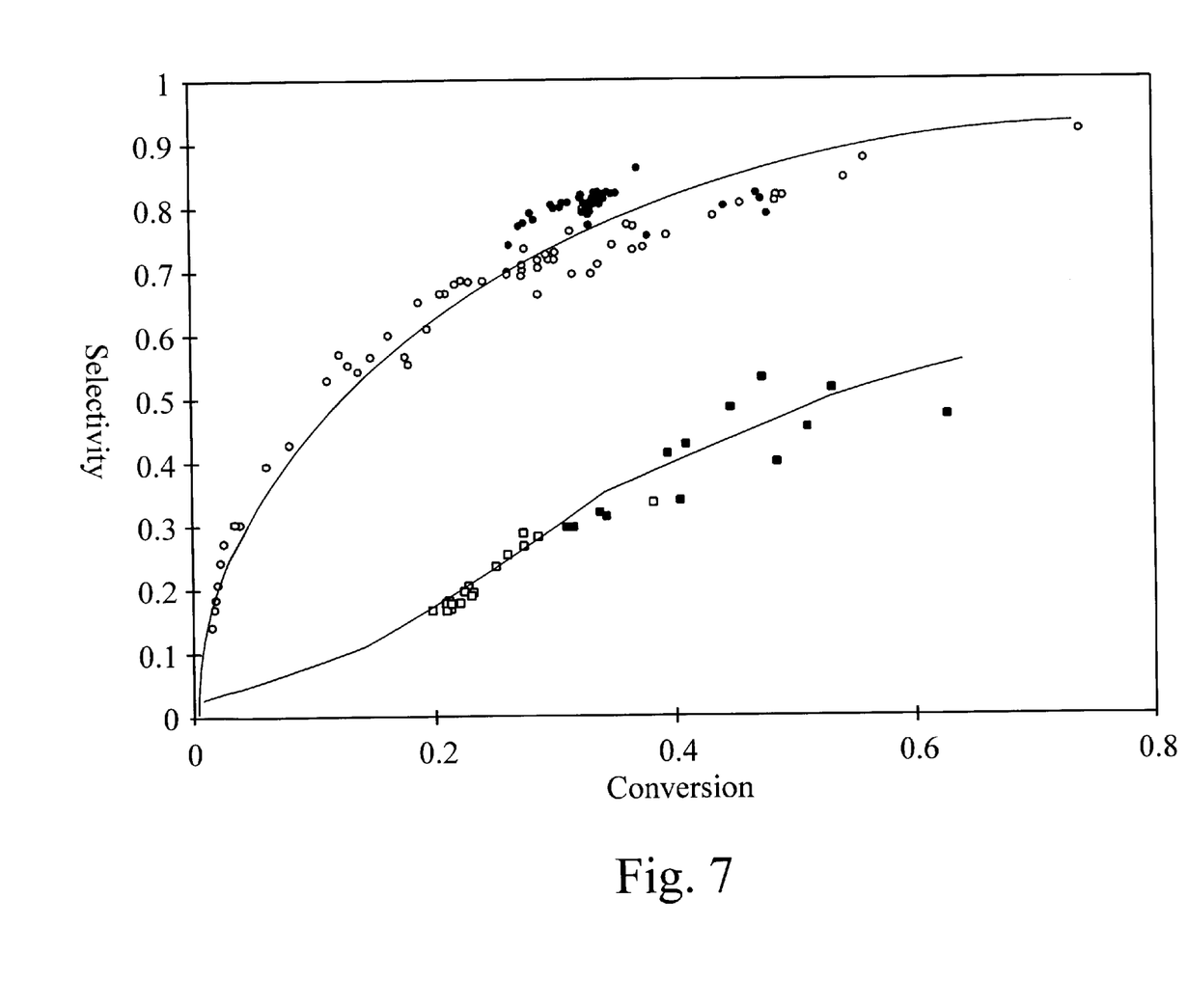
FIG. 7 is a graphical representation showing the benzene selectivity as a function of total conversion at 500° C. over the following catalysts: a) Pt/Tm-KL (preferred preparation) (solid circles); b) Pt/Tm-KL (Fang's preparation) (solid squares); c) Pt/MgAlO (open squares); d) Pt/KL (open circles).

In order to determine the effect of employing different preparation methods on the Pt/Tm-KL zeolite, a Tm-containing catalyst was prepared following the procedures reported by Fang et al. and compared Fang's Tm prepared catalysts' catalytic behavior with that of the Pt/Tm-KL zeolite catalyst described in Example 1 hereinabove. The procedure included the following steps: the KL zeolite was immersed in an aqueous solution which contained $1.0\times10^{-2}$ M $H_2PtCl_6$ and $2.3\times10^{-3}$ M $Tm(NO_3)_3$ at a liquid/solid ratio of 5 $cm^3/g$ to get a Pt content of 1.0 wt % and a Tm content of 0.2 wt % based on the total weight of the catalyst which, according to Fang et al., resulted in the best preparation. After stirring for 12 hours, the suspension was dried in air and then calcined in an oven at 350° C. for 2 hours. FIG. 7 compares the benzene selectivity-vs-conversion curves for the Tm-containing catalysts prepared by the Fang et al. method and the one described in Example 1 hereinabove. It is clear that the performance of the catalyst prepared by the methods of this invention is superior to that of Fang et al.'s preparation.

In order to further emphasize the differences of the two catalysts, herein included is data obtained on two other catalysts. The first one is unmodified Pt/KL, which under sulfur-free conditions exhibits an excellent catalytic performance and has a high selectivity. The other is Pt supported on MgAlO, a basic support which has no microporosity and exhibits a much lower selectivity at a given conversion. The comparison indicates that the catalysts prepared using preparation methods previously reported and disclosed, have poor aromatization selectivity, even in the absence of sulfur poisoning. These results are indicated graphically in FIG. 7.

It is therefore the combination of the presence of a rare earth ion, such as Tm and the presence of a Group VIII metal inside the micropores of the KL-zeolite, as well as the method of preparation, that results in the catalyst herein claimed having superior catalytic activity and selectivity in the presence of sulfur.

Thus, it should be apparent that there has been provided in accordance with the present invention a catalyst and methods of preparing and using it that they satisfy the objectives and advantages set forth above. Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

What is claimed is:

1. A method of reforming an aliphatic hydrocarbon, a cycloaliphatic hydrocarbon, and mixtures thereof, comprising the steps of:

contacting the hydrocarbons under reforming conditions with a catalyst, wherein the catalyst comprises an L-zeolite support having a Group VIII metal associated therewith, wherein the L-zeolite support is calcined and incorporated with a rare earth ion selected from the group consisting of lanthanum, cerium, praseodymium, neodymium, samarium, europium, gadolinium, terbium, dysprosium, holmium, erbium, thulium, ytterbium, lutetium, and combinations thereof.

2. The method of claim 1, further comprising the step of collecting the reformed aliphatic and cycloaliphatic hydrocarbons and mixtures thereof.

3. The method of claim 1, wherein in the step of contacting the hydrocarbons under reforming conditions with a catalyst, the Group VIII metal is platinum.

4. The method of claim 1, wherein in the step of contacting the hydrocarbons under reforming conditions with a catalyst, the Group VIII metal is associated with the L-zeolite support by chemical vapor deposition.

5. The method of claim 1, wherein in the step of contacting the hydrocarbons under reforming conditions with a catalyst, the rare earth ion is thulium.

6. The method of claim 1, wherein in the step of contacting the hydrocarbons under reforming conditions with a catalyst, the rare earth ion is erbium.

7. The method of claim 1, wherein in the step of contacting the hydrocarbons under reforming conditions with a catalyst, the rare earth ion is ytterbium.

8. The method of claim 1, wherein in the step of contacting the hydrocarbons under reforming conditions with a catalyst, the L-zeolite is KL-zeolite.

9. The method of claim 1, wherein in the step of contacting the hydrocarbons under reforming conditions with a catalyst, the rare earth ion is incorporated with the L-zeolite support by ion exchange.

10. The method of claim 1, wherein in the step of contacting the hydrocarbons under reforming conditions with a catalyst, the rare earth ion is incorporated with the L-zeolite support by incipient wetness impregnation.

11. The method of claim 1, wherein in the step of contacting the hydrocarbons under reforming conditions with a catalyst, the hydrocarbons contain sulfur.

12. A method of reforming an aliphatic hydrocarbon, a cycloaliphatic hydrocarbon, and mixtures thereof, comprising the steps of:
    contacting the hydrocarbons under reforming conditions with a catalyst, wherein the catalyst comprises an L-zeolite support having a Group VIII metal associated therewith, wherein the L-zeolite support is anhydrous and incorporated with a rare earth ion selected from the group consisting of lanthanum, cerium, praseodymium, neodymium, samarium, europium, gadolinium, terbium, dysprosium, holmium, erbium, thulium, ytterbium, lutetium, and combinations thereof.

13. A method of aromatizing an aliphatic hydrocarbon, a cycloaliphatic hydrocarbon, or mixtures thereof, comprising the steps of:
    contacting the hydrocarbons under aromatizing conditions with a catalyst, wherein the catalyst comprises an L-zeolite support having a Group VIII metal associated therewith, wherein the L-zeolite support is calcined and incorporated with a rare earth ion selected from the group consisting of lanthanum, cerium, praseodymium, neodymium, samarium, europium, gadolinium, terbium, dysprosium, holmium, erbium, thulium, ytterbium, lutetium, and combinations thereof.

14. The method of claim 13, further comprising the step of collecting the aromatized aliphatic and cycloaliphatic hydrocarbons and mixtures thereof.

15. The method of claim 13, wherein in the step of contacting the hydrocarbons under aromatizing conditions with a catalyst, the Group VIII metal is platinum.

16. The method of claim 13, wherein in the step of contacting the hydrocarbons under aromatizing conditions with a catalyst, the Group VIII metal is associated with the L-zeolite support by chemical vapor deposition.

17. The method of claim 13, wherein in the step of contacting the hydrocarbons under aromatizing conditions with a catalyst, the rare earth ion is thulium.

18. The method of claim 13, wherein in the step of contacting the hydrocarbons under aromatizing conditions with a catalyst, the rare earth ion is erbium.

19. The method of claim 13, wherein in the step of contacting the hydrocarbons under aromatizing conditions with a catalyst, the rare earth ion is ytterbium.

20. The method of claim 13, wherein in the step of contacting the hydrocarbons under aromatizing conditions with a catalyst, the L-zeolite is KL-zeolite.

21. The method of claim 13, wherein in the step of contacting the hydrocarbons under aromatizing conditions with a catalyst, the rare earth ion is incorporated with the L-zeolite support by ion exchange.

22. The method of claim 13, wherein in the step of contacting the hydrocarbons under aromatizing conditions with a catalyst, the rare earth ion is incorporated with the L-zeolite support by incipient wetness impregnation.

23. The method of claim 13, wherein in the step of contacting the hydrocarbons under aromatizing conditions with a catalyst, the rare earth ion is incorporated with the L-zeolite support by chemical vapor deposition.

24. The method of claim 13, wherein in the step of contacting the hydrocarbons under aromatizing conditions with a catalyst, the hydrocarbons contain a predetermined amount of sulfur.

25. A method of aromatizing an aliphatic hydrocarbon, a cycloaliphatic hydrocarbon, or mixtures thereof, comprising the steps of:
    contacting the hydrocarbons under aromatizing conditions with a catalyst, wherein the catalyst comprises an L-zeolite support having a Group VIII metal associated therewith, wherein the L-zeolite support is anhydrous and incorporated with a rare earth ion selected from the group consisting of lanthanum, cerium, praseodymium, neodymium, samarium, europium, gadolinium, terbium, dysprosium, holmium, erbium, thulium, ytterbium, lutetium, and combinations thereof.

26. A method of dehydrogenating an aliphatic hydrocarbon, a cycloaliphatic hydrocarbon, or mixtures thereof comprising the steps of:
    contacting the hydrocarbons under dehydrogenation conditions with a catalyst, wherein the catalyst comprises an L-zeolite support having a Group VIII metal associated therewith, wherein the L-zeolite support is calcined and incorporated with a rare earth ion selected from the group consisting of lanthanum, cerium, praseodymium, neodymium, samarium, europium, gadolinium, terbium, dysprosium, holmium, erbium, thulium, ytterbium, lutetium, and combinations thereof.

27. The method of claim 26, further comprising the step of collecting the dehydrogenated aliphatic and cycloaliphatic hydrocarbons and mixtures thereof.

28. The method of claim 26, wherein in the step of contacting the hydrocarbons under dehydrogenating conditions with a catalyst, the Group VIII metal is platinum.

29. The method of claim 26, wherein in the step of contacting the hydrocarbons under dehydrogenating conditions with a catalyst, the Group VIII metal is associated with the L-zeolite support by chemical vapor deposition, ion exchange, or incipient wetness impregnation.

30. The method of claim 26, wherein in the step of contacting the hydrocarbons under dehydrogenating conditions with a catalyst, the rare earth ion is thulium.

31. The method of claim 26, wherein in the step of contacting the hydrocarbons under dehydrogenating conditions with a catalyst, the rare earth ion is erbium.

32. The method of claim 26, wherein in the step of contacting the hydrocarbons under dehydrogenating conditions with a catalyst, the rare earth ion is ytterbium.

33. The method of claim 26, wherein in the step of contacting the hydrocarbons under dehydrogenating conditions with a catalyst, the L-zeolite is KL-zeolite.

34. The method of claim 26, wherein in the step of contacting the hydrocarbons under dehydrogenating conditions with a catalyst, the rare earth ion is incorporated with the L-zeolite support by ion exchange.

35. The method of claim 26, wherein in the step of contacting the hydrocarbons under dehydrogenating conditions with a catalyst, the rare earth ion is incorporated with the L-zeolite support by incipient wetness impregnation.

36. The method of claim 26, wherein in the step of contacting the hydrocarbons under dehydrogenating conditions with a catalyst, the rare earth ion is incorporated with the L-zeolite support by chemical vapor deposition.

37. The method of claim 26, wherein in the step of contacting the hydrocarbons under dehydrogenating conditions with a catalyst, the hydrocarbons contain sulfur.

38. A method of dehydrogenating an aliphatic hydrocarbon, a cycloaliphatic hydrogen, or mixtures thereof comprising the steps of:

contacting the hydrocarbons under dehydrogenation conditions with a catalyst, wherein the catalyst comprises an L-zeolite support having a Group VIII metal associated therewith, wherein the L-zeolite support is anhydrous and incorporated with a rare earth ion selected from the group consisting of lanthanum, cerium, praseodymium, neodymium, samarium, europium, gadolinium, terbium, dysprosium, holmium, erbium, thulium, ytterbium, lutetium, and combinations thereof.

* * * * *

UNITED STATES PATENT AND TRADEMARK OFFICE
CERTIFICATE OF CORRECTION

PATENT NO.   : 6,096,193
DATED        : August 1, 2000
INVENTOR(S)  : Daniel E. Resasco et al.

It is certified that error appears in the above-identified patent and that said Letters Patent is hereby corrected as shown below:

Column 1,
Line 23, delete "monofunctional, that is," and substitute therefor -- monofunctional. That is, --.
Line 60, delete "Similarly, It" and substitute -- Similarly, it -- therefor.
Line 62, delete "is" and substitute -- are -- therefor.

Column 5,
Line 18, delete "is" and substitute -- are -- therefor.

Column 6,
Line 17, delete "atalytic" and substitute -- catalytic -- therefor.
Line 35, delete "both" and substitute -- these -- therefor.

Column 12, claim 38,
Line 5, delete "hydrogen," and substitute therefor -- hydrocarbon, --.

Signed and Sealed this

Eleventh Day of December, 2001

Attest:

NICHOLAS P. GODICI
Attesting Officer
*Acting Director of the United States Patent and Trademark Office*